United States Patent
Bird

[11] Patent Number: 5,917,304
[45] Date of Patent: Jun. 29, 1999

[54] BATTERY CHARGING APPARATUS FOR ELECTRIC POWERED VEHICLES

[75] Inventor: Curtis D. Bird, 1220 Tasman Dr. Apt 87 D, Sunnyvale, Calif. 94089

[73] Assignee: Curtis D. Bird, Sunnyvale, Calif.

[21] Appl. No.: 08/857,790

[22] Filed: May 16, 1997

[51] Int. Cl.⁶ .................................................. H01M 10/46
[52] U.S. Cl. ........................................... 320/101; 320/104
[58] Field of Search .................................. 320/101, 103, 320/104, FOR 101, FOR 160, DIG. 34, DIG. 36; 322/2 R, 4; 290/53, 54, 55, 44

[56] References Cited

U.S. PATENT DOCUMENTS

| | | | |
|---|---|---|---|
| 3,556,239 | 1/1971 | Spahn | 180/68 |
| 3,621,930 | 11/1971 | Dutchak | 180/65 |
| 3,713,503 | 1/1973 | Haan | 180/65 |
| 3,876,925 | 4/1975 | Stoeckert | 322/1 |
| 3,878,913 | 4/1975 | Lionts et al. | 180/65 |
| 4,002,218 | 1/1977 | Horvat | 180/65 |
| 4,141,425 | 2/1979 | Treat | 180/65 |
| 4,179,007 | 12/1979 | Howe | 180/65 |
| 4,254,843 | 3/1981 | Han et al. | 180/165 |
| 5,280,827 | 1/1994 | Taylor et al. | 180/165 |
| 5,559,379 | 9/1996 | Voss | 310/63 |
| 5,680,032 | 10/1997 | Pena | 290/55 X |

*Primary Examiner*—Edward H. Tso
*Attorney, Agent, or Firm*—Blakely, Sokoloff, Taylor and Zafman

[57] ABSTRACT

A method and apparatus for charging a battery in an electric powered vehicle are provided. The method of charging the battery comprises rotating a fan in response to an airstream generated by a movement of the electric powered vehicle. Current is produced in at least one current generating device in response to rotation of the fan. The current produced is used to charge the batteries of the electric powered vehicle. A battery charging apparatus for an electric powered vehicle is provided comprising a duct that conveys air through the electric powered vehicle in response to movement of the electric powered vehicle. A fan is coupled to the duct, and the fan is rotated by the movement of the air. A current generating device is coupled to the fan. The current generating device produces current in response to rotation of the fan, and the current is used to charge the batteries of the electric powered vehicle.

10 Claims, 7 Drawing Sheets

BATTERY CHARGING APPARATUS FOR ELECTRIC POWERED VEHICLES

FIELD OF THE INVENTION

This invention relates to electric vehicles. More particularly, this invention relates to charging the batteries of an electric vehicle.

BACKGROUND OF THE INVENTION

Electrotechnologies save on capital investment, installation, and operation relative to applications fueled by other energy sources. At the same time a significant advantage is realized in that electrotechnologies provide for a cleaner environment. One example of efficient new electrotechnologies is the electric vehicle recently introduced by automobile manufacturers.

The present generation electric vehicles are designed as second cars or for those who primarily drive around town or commute short distances. A current generation electric vehicle carries 1175 pounds of lead-acid batteries. In these current generation electric vehicles, a single charge, which takes several hours to complete, will provide enough power for about four hours of city driving. According to General Motors, the electric vehicles with lead-acid batteries get about 70 miles of city driving or 90 miles of highway driving on 85 percent of a battery charge.

These figures, however, were measured in the laboratory with an electric car driving on a chassis dynamometer according to a test schedule invented by the Environmental Protection Agency to measure an average car's fuel economy. In tests involving actual real life highway scenarios including winds, grades, and traffic, the electric cars actually produce a reported range of approximately 65 miles on a single charge. Thus, electric cars currently have an actual range that is less than the round-trip commute that millions of metropolitan area residents endure every day.

Power consumption in an electric vehicle is affected by terrain grades, traffic conditions or number of stops, how hard the car is driven, wind, temperature, vehicle weight, number of batteries, and type of batteries. Power consumption is also affected by the state of the other electrical equipment in the vehicle, for instance the windshield wipers, air conditioning, stereo or radio, and lights. When the electric vehicle batteries have lost 70 percent of their power, battery output is automatically reduced to conserve the remaining energy, and the car drives substantially more slowly until the batteries have been recharged, typically by "plugging" the car into an electric outlet. Because of the relatively short range of the current generation electric vehicles, a conservative driving style is required. This conservative driving style comprises precise accelerations and slow, coasting stops, aimed at saving power. With better batteries and a realistic infrastructure to replenish them, electric cars could be a sensible alternative to the car powered by an internal combustion engine.

In addition to the significant reduction in pollution, another advantage of the electric vehicle is that the cost of running the vehicle is low. The average current generation electric vehicle with lead-acid batteries charged at the current average grid power rate would have a fuel cost that is 15% of the cost of powering the same vehicle with an internal combustion engine. However, when an electric vehicle is fully charged it has the equivalent energy of only about a gallon and a half of gasoline on board. Therefore, battery technology has resulted in a long wait for an effective electric car because few drivers want to lumber around town in a vehicle with a very short range weighed down with over half a ton of lead-acid batteries. While the range of the current generation electric vehicles can be increased with frequent chargings, there is currently no infrastructure to support charging these vehicles while away from one's home.

While Americans like driving long distances which the current generation of electric cars cannot support, electric vehicles are a certainty because of the zero-emission requirements that take effect in some states in the very near future. Consequently, a concentrated effort is being made by domestic and foreign automobile manufacturers and governments to make electric vehicles more appealing. As a result of this effort, several solutions are being pursued to the battery life problem of the current generation electric vehicle.

One solution which is currently being undertaken is a planned network of high power charging stations. These stations will be installed across the country and will allow drivers to quickly recharge the electric vehicle batteries, thereby allowing drivers to travel farther without running out of power. The major disadvantage to this solution is that is requires the development of a new infrastructure at a significant cost with regards to time and money.

Automobile manufacturers have also been experimenting with cars powered by a compact fuel cell that converts gasoline to hydrogen, which then powers an electric motor. This propulsion package fits into a normal-size car and promises approximately 80 miles per gallon and a range of about 500 miles. While a 500 mile range is an improvement over the current generation electric vehicle, it is still a limit which few drivers might tolerate because of the high cost of the vehicle.

Automobile manufacturers are also experimenting with various hybrid solutions such as a vehicle that has an electric motor for city use and a diesel engine for the highway. The hybrid vehicle solves the fundamental problem which has plagued electric vehicles from the start, the restricted range and the lengthy period normally needed to recharge batteries. In a hybrid vehicle, an internal combustion engine is used to provide acceptable highway performance while simultaneously recharging the electrical power system's batteries. In urban areas where exhaust pollution is a contentious issue, the vehicle will run on battery power alone. A variant of the hybrid vehicle uses a much smaller internal combustion engine running at a constant speed to keep the batteries charged. However, the hybrid vehicle does pollute the environment when running on the petroleum engine.

Automobile manufacturers are investing huge amounts in battery development. The new nickel-metal hydride and lithium-ion batteries can provide double the distance of lead-acid varieties. A zinc-air battery may also be available which is reputed to double the range of an electric vehicle for the same weight. Electric cars with lead-acid batteries can reach speeds of up to 60 miles per hour and travel a mean maximum distance of approximately 60 miles on a single charge. While still providing a significant range restriction, the new generation batteries stretch this to about 80 miles per hour and a mean maximum distance of about 125 miles on a single charge.

The superbatteries needed to give electric vehicles viable range are still a long way technologically. The other most promising long-term technology, the hydrogen fuel cell, is also a long way technologically. Therefore, the hybrid is acknowledged industry-wide as the nearest thing to a technological answer, and it still does not provide the best protection for the environment. Consequently, there is a need for a battery charging device that will significantly increase the range of the electric vehicle while reducing the period needed to recharge the batteries of an electric vehicle, thereby completely eliminating the hybrid vehicle requirement for an internal combustion engine.

SUMMARY

A method and apparatus for charging a battery in an electric powered vehicle are provided. The method of charging the battery comprises rotating a fan in response to an airstream generated by a movement of the electric powered vehicle. Current is produced in at least one current generating device in response to rotation of the fan. The current produced is used to charge the batteries of the electric powered vehicle.

A battery charging apparatus for an electric powered vehicle is provided comprising a duct that conveys air through the electric powered vehicle in response to movement of the electric powered vehicle. A fan is coupled to the duct, and the fan is rotated by movement of the air. A current generating device is coupled to the fan. The current generating device produces current in response to rotation of the fan, and the current is used to charge the batteries of the electric powered vehicle.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for charging a battery in an electric powered vehicle are provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention. It will be recognized by one skilled in the art that the configuration and size of components used in the battery charging method and apparatus disclosed herein may be varied and optimized for a particular application using well known engineering principles. Thus, any particular electric vehicle configuration using the battery charging method and apparatus disclosed herein will receive and convey air in the battery charging apparatus at a pressure and a velocity that maximizes the current generated for a velocity of the electric vehicle as determined according to known engineering principles.

Figure 1:
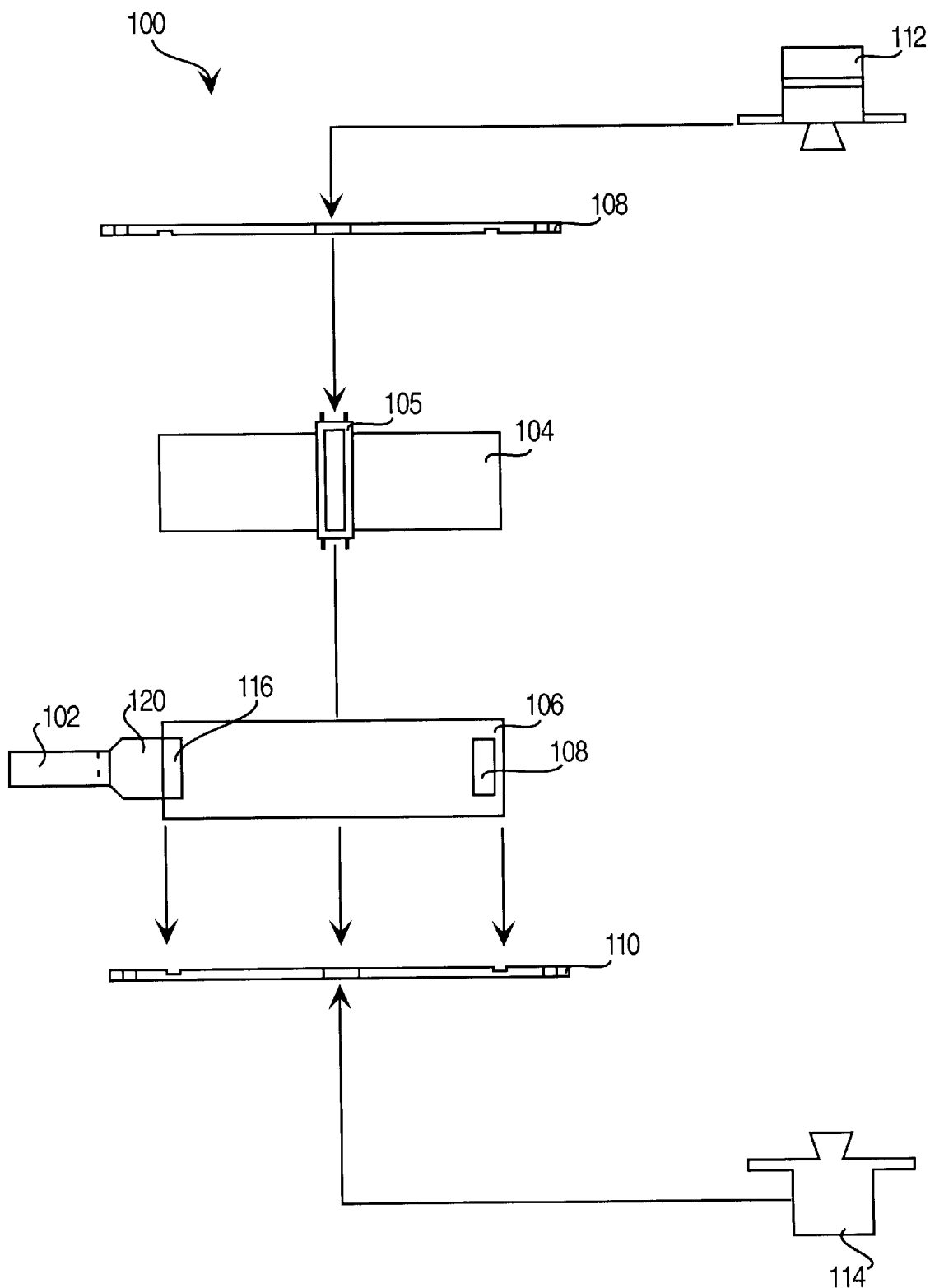
FIG. 1 illustrates an embodiment of a battery charging apparatus for an electric powered vehicle.

FIG. 1 illustrates an embodiment of a battery charging apparatus for an electric powered vehicle. The embodiment of the present invention described herein is for an electric car; however, the battery charging apparatus of the present invention might be used in any vehicle having batteries and providing an airstream. The battery charging apparatus 100 comprises an air duct 102, a fan unit 104–110, and current generating devices 112 and 114. The fan unit 104–110 includes a fan 104 contained within a fan shroud or housing 106, an upper shroud plate 108, and a lower shroud plate 110. The fan 104 and fan shroud 106 are coupled to the upper shroud plate 108 and the lower shroud plate 110. The fan shroud 106 has an intake port 116 and an exhaust port 118. An inverter 120 is coupled to the intake port 116 of the fan shroud 106. The inverter 120 receives air from an air duct 102. The current generating devices consists of two alternators 112 and 114. A first alternator 112 is coupled to the upper shroud plate 108 and to the top of the fan shaft 105. A second alternator 114 is coupled to the lower shroud plate 110 and to the bottom of the fan shaft 105. The battery charging apparatus described herein may be configured to work with multiple battery types. Each of the component parts of the battery charging apparatus will now be discussed.

Figure 2:
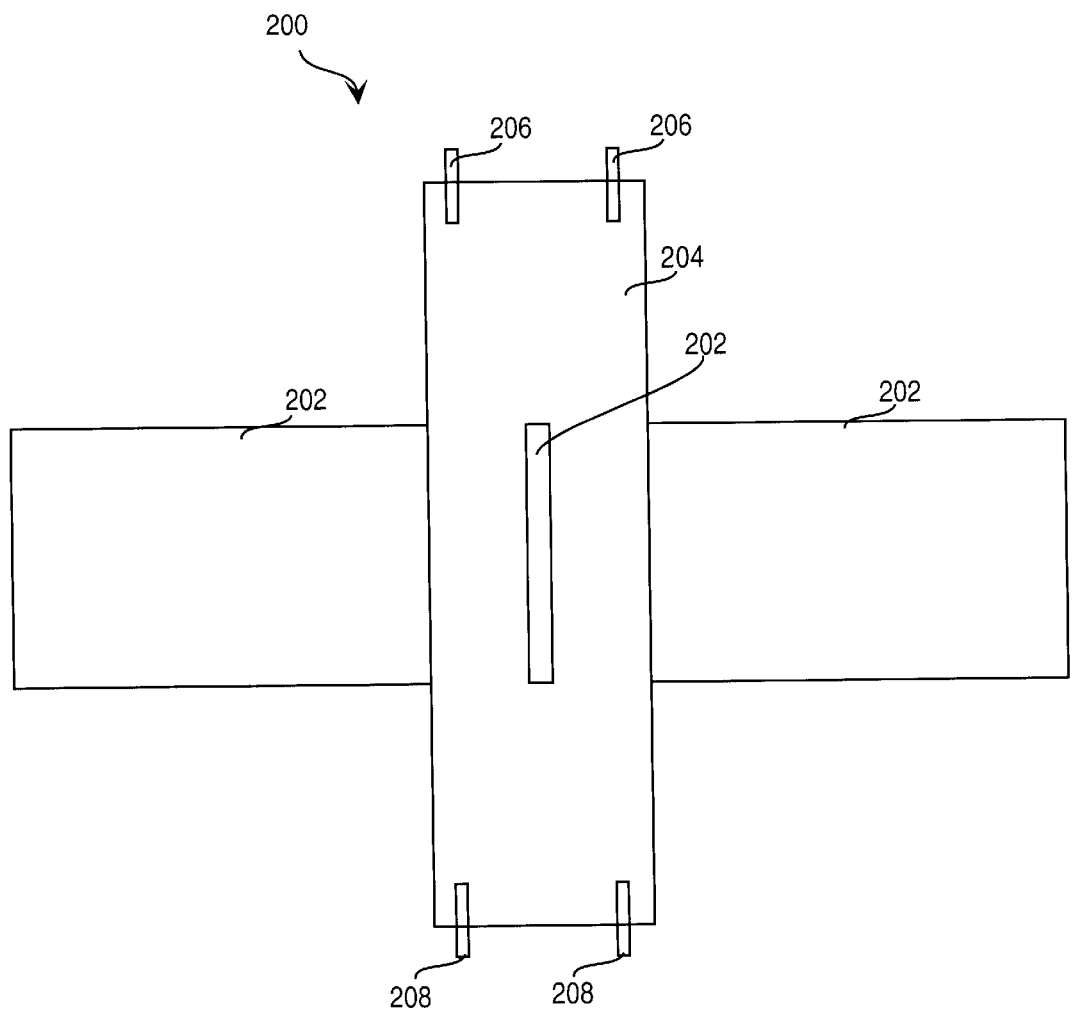
FIG. 2 illustrates a side view of an embodiment of a fan used in the battery charging apparatus of the present invention.
Figure 3:
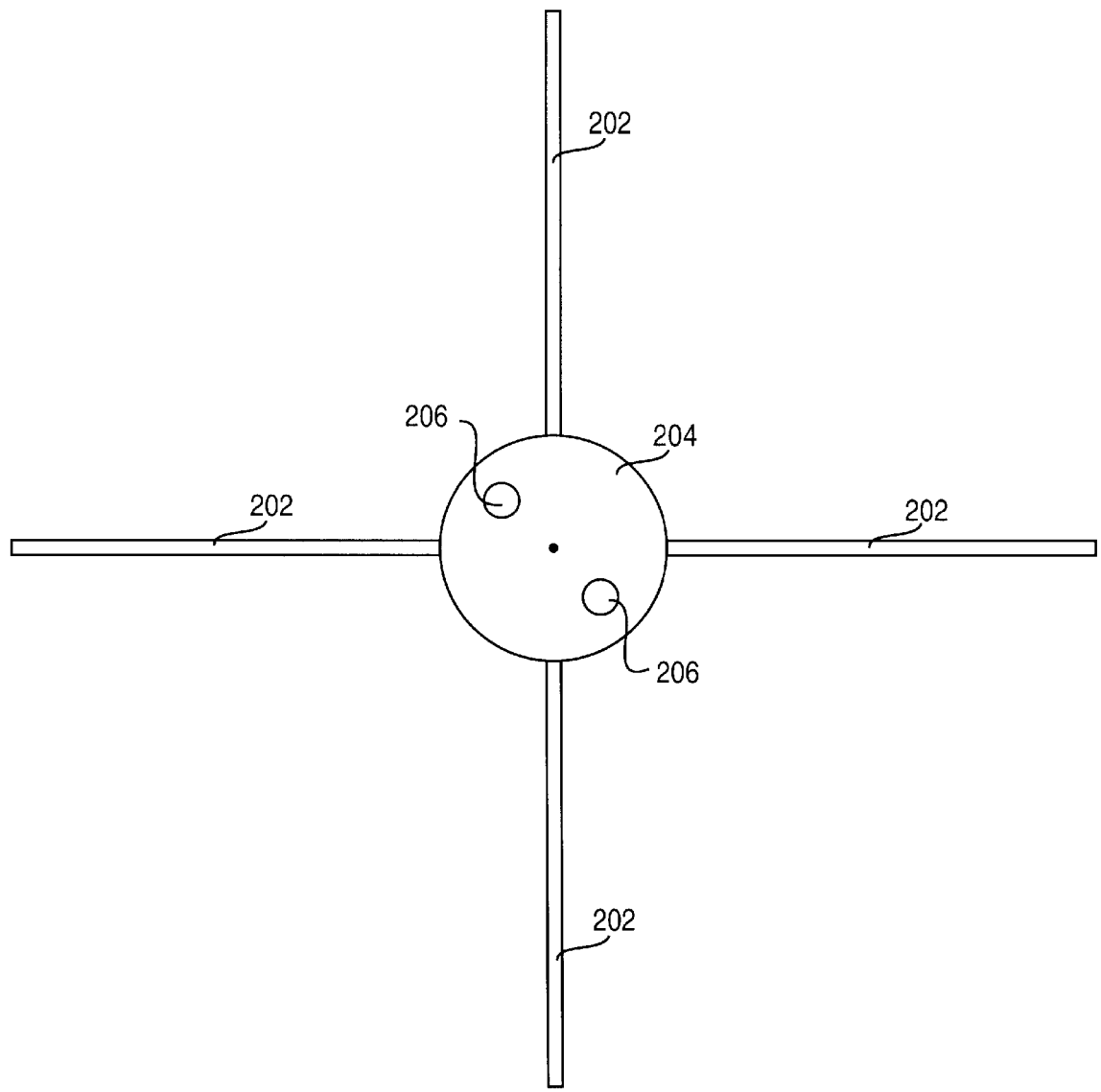
FIG. 3 illustrates a top view of an embodiment of a fan used in the battery charging apparatus of the present invention.

FIGS. 2 and 3 illustrate an embodiment of a fan used in the battery charging apparatus of the present invention. FIG. 2 illustrates a side view of an embodiment of a fan used in the battery charging apparatus of the present invention. FIG. 3 illustrates a top view of an embodiment of a fan used in the battery charging apparatus of the present invention.

In one embodiment, the fan 200 has four rectangular blades 202 attached to a fan shaft 204. The number and shape of the blades 202, however, may vary depending on the design parameters of the battery charging apparatus. The diameter of the fan 200 is seven inches. The number of fan blades 202 along with the diameter of the fan blades 202 relative to the maximum speed of the fan should be configured according to known engineering principles to minimize the noise and vibration of the battery charging apparatus when operating. In one embodiment, each of the fan blades 202 is 2.75 inches in height. The height of the fan blades 202 relative to the diameter of the fan 200 and relative to the assembled shroud plates is configured according to known engineering principles to receive and convey air in the fan chamber at a pressure and a velocity that maximizes the rotational velocity of the fan. In one embodiment, the fan shaft 204 is five and one-half inches long and three inches in diameter.

The fan shaft 204 has two transfer pins 206 in the top of the fan shaft 204 and two transfer pins 208 in the bottom of the fan shaft 204. In one embodiment, each of the transfer pins 206 and 208 has a diameter of 0.250 inches and protrudes 0.375 inches from the fan shaft 204. The transfer pins 206 and 208 are used to couple the fan shaft 204 to the current generating devices. Alternate embodiments may use, but are not limited to, bolts, slot and key, or press fit to couple the fan shaft 204 to the current generating device. An alternate embodiment couples the fan shaft to a flywheel, and couples the flywheel to the current generating devices.

Figure 4:
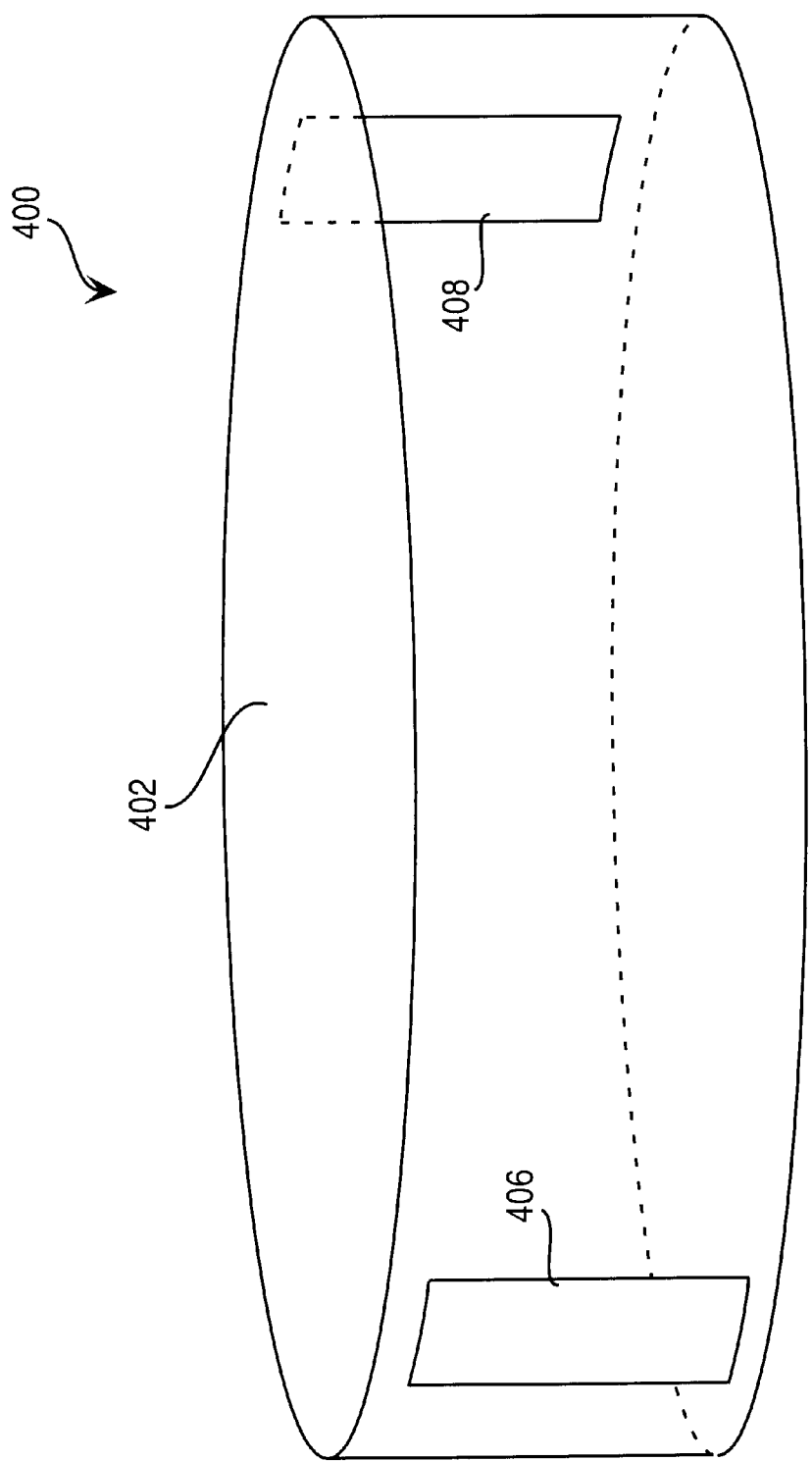
FIG. 4 illustrates an embodiment of a fan shroud used in the battery charging apparatus of the present invention.

FIG. 4 illustrates an embodiment of a fan shroud used in the battery charging apparatus of the present invention. The fan shroud 400 forms a fan chamber or housing 402 that has a diameter of 8 inches. The diameter and shape of the fan chamber 402 relative to the diameter of the fan is configured according to known engineering principles to receive and convey air in the fan chamber 402 at a pressure and a velocity that maximizes the rotational velocity of the fan. The fan shroud 400 has an intake port 406 and an exhaust port 408. In one embodiment, the intake port 406 has a height of 2.75 inches and is configured to receive air into the fan chamber 402 from a duct at a pressure and a velocity that maximizes the rotational velocity of the fan, thereby maximizing the current generated for a velocity of the electric vehicle. The exhaust port 408 has a height of 2.75 inches and is configured to remove air from the fan chamber 402 in such a manner as to minimize the effect on the rotational velocity of the fan. In alternate embodiments, the size of the intake 406 and exhaust 408 ports relative to the duct configuration, relative to the size of the fan, and relative to the shape and size of the fan chamber 402 is configured according to known engineering principles to convey air in the battery charging apparatus at a pressure and a velocity that maximizes the rotational velocity of the fan and thus the current generated.

Figure 5:
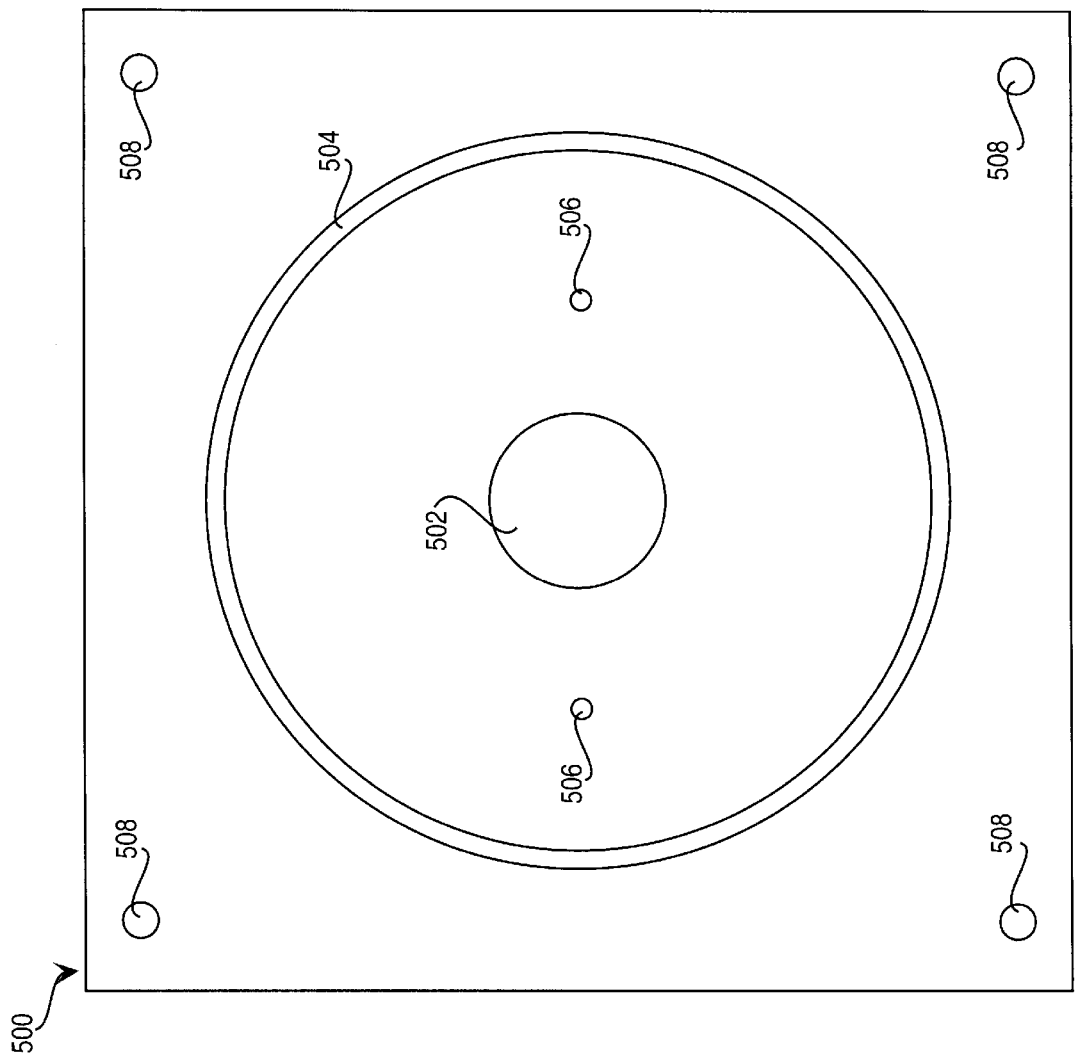
FIG. 5 illustrates an embodiment of a shroud plate used in the battery charging apparatus of the present invention.

FIG. 5 illustrates an embodiment of a shroud plate used in the battery charging apparatus of the present invention. In an embodiment of the present invention, the shroud plate 500 has a width equal to 13 inches and a length equal to 13 inches. However, the dimensions of the shroud plate 500 may vary with the configuration of the battery charging apparatus for a particular application.

With reference to FIG. 1, this shroud plate configuration may be used for the upper shroud plate 108 and the lower shroud plate 110. The shroud plate 500 has a center hole 502 which receives the fan shaft. When the shroud plate 500 is used as the upper shroud plate 108, the center hole 502 receives the top of the fan shaft. The center hole 502 may also receive bearings which receive the fan shaft. When the shroud plate 500 is used as the lower shroud plate 110, the center hole 502 receives the bottom of the fan shaft. The shroud plate 500 has a slot 504 which measures 0.25 inches in width. The slot 504 receives the fan shroud. The shroud plate 500 has two threaded holes 506 that are three-eighths of an inch in diameter. These holes 506 are located on opposing sides of the center hole 502 and are used for mounting the current generating devices to the shroud plates 108 and 110. In one embodiment, the current generating devices are alternators. However, generators or magneto coils may be used as current generating devices. The size and location of these holes 506 may vary depending on the type of current generating device employed in the battery charging apparatus. Each shroud plate 500 also has four through holes 508, one in each corner of the shroud plate, for coupling the upper 108 and the lower 110 shroud plates together once the shroud 106 and the fan 104 have been properly placed between the upper 108 and lower 110 shroud plates.

Figure 6:
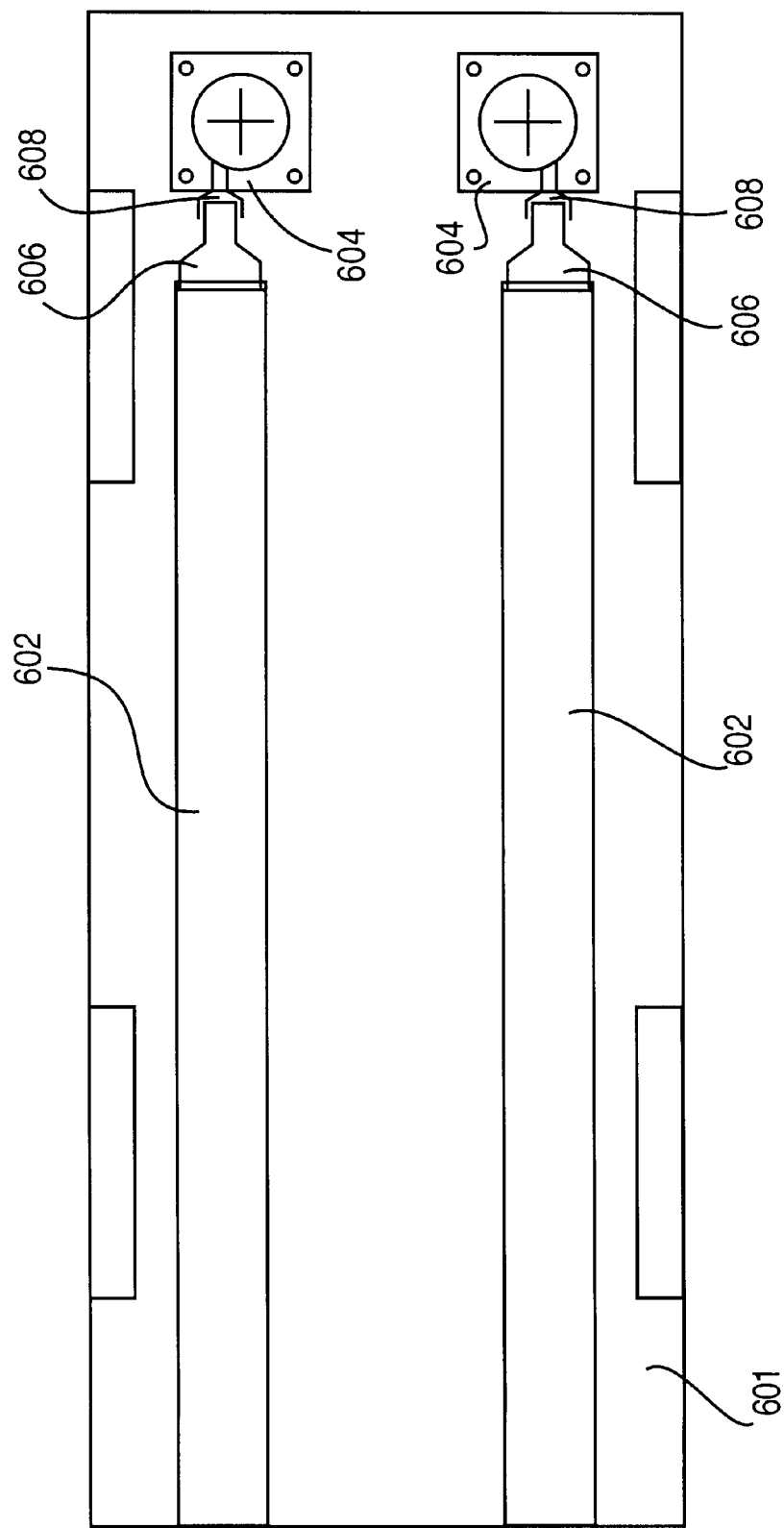
FIG. 6 illustrates a top view of an installation of battery charging apparatus in an electric powered vehicle.
Figure 7:
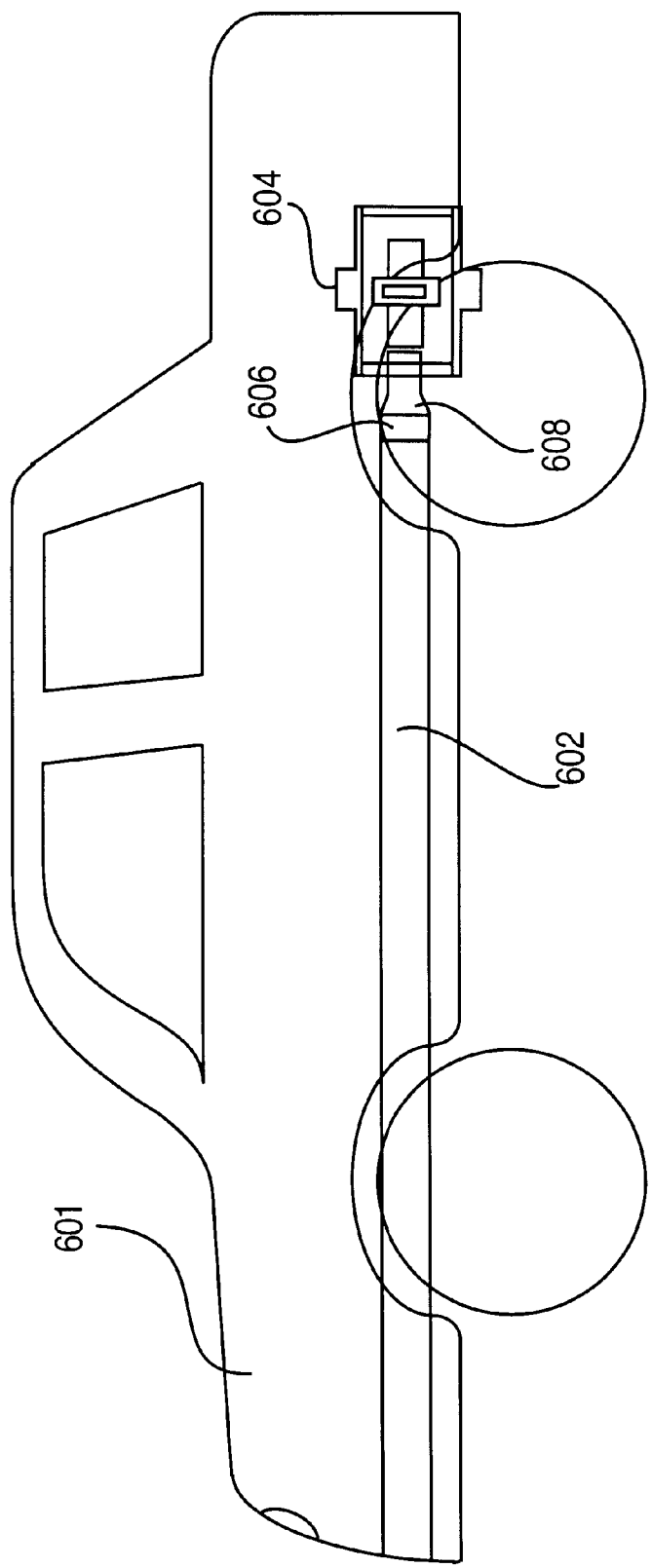
FIG. 7 illustrates a side view of an installation of battery charging apparatus in an electric powered vehicle.

FIGS. 6 and 7 illustrate an installation of a battery charging apparatus in an electric powered vehicle. FIG. 6 illustrates a top view of an installation of battery charging apparatus in an electric powered vehicle.

FIG. 7 illustrates a side view of an installation of battery charging apparatus in an electric powered vehicle. Operation of the battery charging apparatus will be described with reference to FIGS. 6 and 7. The embodiment of the installation shown herein has two battery charging apparatus installed in the rear of an electric vehicle. However, any number of battery charging apparatus may be installed in any of a number of locations in any of a number of electric vehicles, the battery charging apparatus charging any number of batteries or sets of batteries.

Each battery charging apparatus comprises a duct 602 conveying air through the electric vehicle 601 to a fan unit 604 in response to movement of the vehicle 601. In one embodiment, the width of each duct 602 is twelve inches, but the diameter of the duct 602 may depend on the location and configuration of the duct 602 and the size of the battery charging apparatus.

The upper limit of the duct 602 width is determined by the width of the electric vehicle in which the battery charging apparatus is installed. The lower limit of the duct 602 width is determined by the minimum volume, pressure, and velocity of air that is required to turn the fan of the battery charging apparatus at a rotational velocity that generates charging current as determined according to known engineering principles. The length of the intake duct is determined by the location of the duct intake and the location of the fan unit. The intake of the duct 602 is shown at the front of the electric vehicle 601. However, the duct 602 intake may be placed at any location on the electric vehicle 601 which allows for the conveyance of an airstream to the fan unit 604 of the battery charging apparatus.

Upon movement of the electric vehicle 601, each duct 602 conveys air to a reducer 606. The reducer 606 channels the airflow from the duct into an inverter 608 which is shaped to introduce the airflow into the fan unit 604.

The combined configuration of the duct 602, the reducer 606, and the inverter 608 should have the effect of receiving and conveying air in the battery charging apparatus at a pressure and a velocity that maximizes the rotational velocity of the fan, thereby maximizing the current generated for a velocity of the electric vehicle 601 as determined according to known engineering principles. The fan is coupled to two current generating devices in the form of alternators. The alternators are coupled to the batteries or sets of batteries (not shown) of the electric vehicle 601. The alternators produce current in response to rotation of the fan by the intake airflow, thereby charging the batteries of the electric vehicle 601 when the electric vehicle 601 is moving.

In one embodiment of the present invention, the current generating devices of a single battery charging apparatus are coupled to a set of batteries of an electric vehicle. In another embodiment, the current generating devices of a single battery charging apparatus are selectively coupled to one of a number of sets of batteries of an electric vehicle. In another embodiment, the current generating devices of multiple battery charging apparatus are selectively coupled to multiple battery sets.

The selective coupling of the battery charging apparatus to the batteries of an electric vehicle may be accomplished with a switch that is responsive to the state or amount of charge available in each of the sets of batteries. Therefore, the current generating devices of the battery charging apparatus may be coupled to a set of batteries having the lowest charge. The selective coupling may also be selected by the electric vehicle operator. The selective coupling may be accomplished by a computer processor.

Thus, a method and apparatus for charging a battery in an electric powered vehicle have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A battery charging apparatus for an electric powered vehicle comprising:

at least one duct conveying air through said electric powered vehicle in response to movement of said electric powered vehicle;

at least one fan coupled to said at least one duct, said at least one fan rotated by the movement of said air; and at least one current generating device coupled to each of an upper and a lower fan shroud plate and coupled to said at least one fan, said at least one current generating device producing current in response to rotation of said at least one fan, said current charging at least one battery of said electric powered vehicle.

2. The apparatus of claim 1, wherein said at least one duct is configured to provide air to said at least one fan at a pressure and a velocity that maximizes the current generated for a velocity of said electric powered vehicle.

3. The apparatus of claim 1, wherein said at least one fan comprises:

at least one fan housing coupled to said at least one duct;

at least one fan shaft coupled to said at least one current generating device; and a plurality of fan blades coupled to said at least one fan shaft.

4. The apparatus of claim 3, wherein said at least one fan housing and said plurality of fan blades are configured to receive and convey air at a pressure and a velocity that maximizes the current generated for a velocity of said electric powered vehicle.

5. The apparatus of claim 3, wherein said at least one fan shaft is coupled to at least one flywheel, said at least one flywheel coupled to said at least one current generating device.

6. The apparatus of claim 1, wherein two current generating devices are coupled to one fan.

7. The apparatus of claim 1, wherein said at least one current generating device is selectively coupled to one of a plurality of sets of batteries, said selective coupling responsive to the state of charge of said plurality of sets of batteries.

8. The apparatus of claim 7, wherein said at least one current generating device is coupled to a one of a plurality of sets of batteries having the lowest state of charge.

9. The apparatus of claim 1, wherein a plurality of current generating devices are selectively coupled to a plurality of batteries, said selective coupling responsive to the state of charge of each of said plurality of batteries.

10. The apparatus of claim 1, wherein said current generating device is an alternator.

* * * * *